(12) United States Patent
Roberts et al.

(10) Patent No.: US 10,247,314 B2
(45) Date of Patent: *Apr. 2, 2019

(54) PLUG VALVE AND METHODS

(71) Applicant: TECH ENERGY PRODUCTS, L.L.C., Bossier City, LA (US)

(72) Inventors: Todd Roberts, Bossier City, LA (US); Barton Hickie, Oklahoma City, OK (US)

(73) Assignee: Tech Energy Products, L.L.C., Bossier City, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,405

(22) Filed: Jan. 19, 2018

(65) Prior Publication Data

US 2018/0142797 A1    May 24, 2018

Related U.S. Application Data

(63) Continuation of application No. 15/350,304, filed on Nov. 14, 2016, now Pat. No. 9,897,223.

(60) Provisional application No. 62/256,483, filed on Nov. 17, 2015.

(51) Int. Cl.
| | |
|---|---|
| *F16K 25/00* | (2006.01) |
| *F16K 5/22* | (2006.01) |
| *F16K 5/04* | (2006.01) |
| *F16K 27/06* | (2006.01) |

(52) U.S. Cl.
CPC ............ *F16K 5/225* (2013.01); *F16K 5/0407* (2013.01); *F16K 5/0471* (2013.01); *F16K 25/00* (2013.01); *F16K 27/065* (2013.01)

(58) Field of Classification Search
CPC ...... F16K 5/225; F16K 27/065; F16K 5/0471; F16K 5/0407; F16K 25/00
USPC ........................ 251/309–312, 315.01–315.16, 251/314–317.01, 355
See application file for complete search history.

(56) References Cited

U.S. PATENT DOCUMENTS

| | | |
|---|---|---|
| 1,086,221 A | 2/1914 | Reynolds |
| 2,547,116 A | 4/1951 | Gould |
| 2,911,187 A | 11/1959 | Owsley |

(Continued)

OTHER PUBLICATIONS

Notice of Allowance in related U.S. Appl. No. 15/350,304, dated Dec. 27, 2017 (12 pages).

*Primary Examiner* — John Bastianelli
(74) *Attorney, Agent, or Firm* — Haynes and Boone, LLP

(57) ABSTRACT

A plug valve including a valve body defining a cavity and a pair of fluid passages intersecting the cavity, the cavity defining a tapered interior surface of the valve body, a plug extending within the cavity, the plug defining an exterior surface and a fluid passage adapted to be substantially aligned with the fluid passages of the valve body, and an insert extending within the cavity and circumferentially about at least a portion of the plug, the insert defining a pair of fluid passages substantially aligned with the fluid passages of the valve body, respectively. In several exemplary embodiments, the plug valve is used in oil or gas operations, such as, for example, the fracturing or gravel packing of a subterranean wellbore, with the plug valve being used to control the flow of fracturing and/or gravel-packing fluids. Exemplary embodiments of methods associated with the plug valve are also described.

20 Claims, 11 Drawing Sheets

(56) References Cited

U.S. PATENT DOCUMENTS

| | | | |
|---|---|---|---|
| 3,133,722 | A | 5/1964 | McGuire et al. |
| 3,160,387 | A | 12/1964 | Windsor |
| 3,314,644 | A | 4/1967 | Dwyer |
| 3,360,236 | A | 12/1967 | Hulslander |
| 3,479,006 | A | 11/1969 | Brown |
| 3,567,177 | A | 3/1971 | Mueller |
| 3,920,036 | A | 11/1975 | Westenrieder |
| 3,974,869 | A | 8/1976 | Abe |
| 3,991,975 | A | 11/1976 | Sibrava |
| 4,113,228 | A * | 9/1978 | Frye .................... F16K 5/0435 251/159 |
| 4,510,966 | A | 4/1985 | Parsons, Jr. |
| 4,511,120 | A | 4/1985 | Conley |
| 4,580,762 | A | 4/1986 | Hirtz |
| 4,796,858 | A | 1/1989 | Kabel |
| 5,050,843 | A | 9/1991 | Brooks |
| 6,655,658 | B2 | 12/2003 | Neal et al. |
| 6,675,825 | B1 | 1/2004 | Reeves et al. |
| 7,204,474 | B2 | 4/2007 | McGuire et al. |
| 7,481,418 | B2 | 1/2009 | Artherholt |
| 7,597,307 | B2 | 10/2009 | Artherholt |
| 7,699,291 | B2 | 4/2010 | Artherholt |
| 7,703,205 | B2 | 4/2010 | McGuire et al. |
| 7,845,619 | B2 | 12/2010 | Artherholt |
| 7,946,558 | B2 | 5/2011 | McGuire et al. |
| 8,286,940 | B2 | 10/2012 | Hahn |
| 8,297,592 | B2 | 10/2012 | McGuire et al. |
| 9,103,448 | B2 | 8/2015 | Witkowski et al. |
| 9,638,337 | B2 | 5/2017 | Witkowski et al. |

\* cited by examiner

PLUG VALVE AND METHODS

CROSS-REFERENCE TO RELATED APPLICATION

This application is a continuation of U.S. patent application Ser. No. 15/350,304, filed Nov. 14, 2016, which claims priority to, and the benefit of the filing date of, U.S. patent application No. 62/256,483, filed Nov. 17, 2015, the entire disclosures of which are hereby incorporated herein by reference.

TECHNICAL FIELD

The present disclosure relates in general to valves and, in particular, to plug valves used in oil or gas operations.

BACKGROUND

In oil or gas operations, such as, for example, the fracturing or gravel packing of a subterranean wellbore, one or more plug valves may be used to control the flow of fracturing and/or gravel-packing fluids. A plug valve generally includes a valve body defining a pair of fluid passages that intersect an internal cavity formed in the valve body. The internal cavity of the valve body accommodates an insert and a plug. The plug extends within and engages the insert, which insert, in turn, extends within and engages the valve body. The plug and the insert include fluid passages that are adapted to be substantially aligned with the respective fluid passages of the valve body. Moreover, the plug is adapted to rotate relative to the insert and the valve body to selectively prevent or allow the flow of a fracturing or gravel-packing fluid through the respective fluid passages of the valve body, the insert, and the plug.

The extreme pressures, temperatures, and flow rates encountered by the plug valve during oil or gas operations often cause thermal expansion of the plug valve. Moreover, axial forces such as, for example, hydraulic lift, are imparted to the insert and/or the plug during operation of the plug valve. In some cases, due to the thermal expansion of the plug valve, the plug valve is unable to maintain the substantial alignment between the respective fluid passages of the plug, the insert, and the valve body. As a result, the axial forces imparted to the plug and/or the insert during operation of the plug valve urge the fluid passages of the plug, the insert, and the valve body out of substantial alignment with one another. The resulting misalignment causes wear, erosion, or complete wash-out of the plug, the insert, and/or the valve body.

Therefore, what is needed is an apparatus or method to address one or more of the foregoing issues, and/or one or more other issues.

DETAILED DESCRIPTION

Figure 1A:
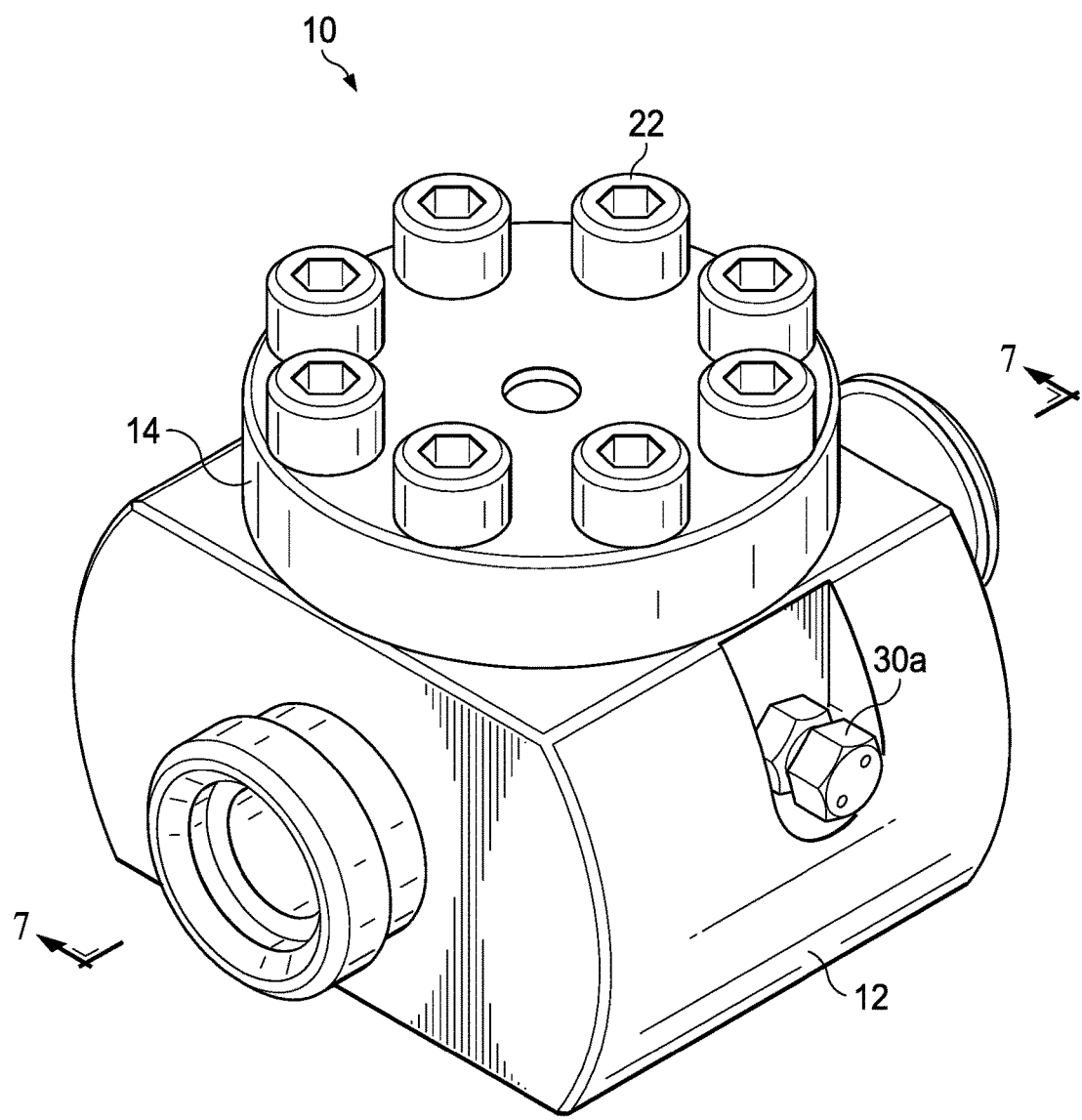
FIG. 1A is a perspective view of a plug valve, including a valve body, a bonnet, a tapered insert, a plug, and a biasing member, according to an exemplary embodiment.
Figure 1B:
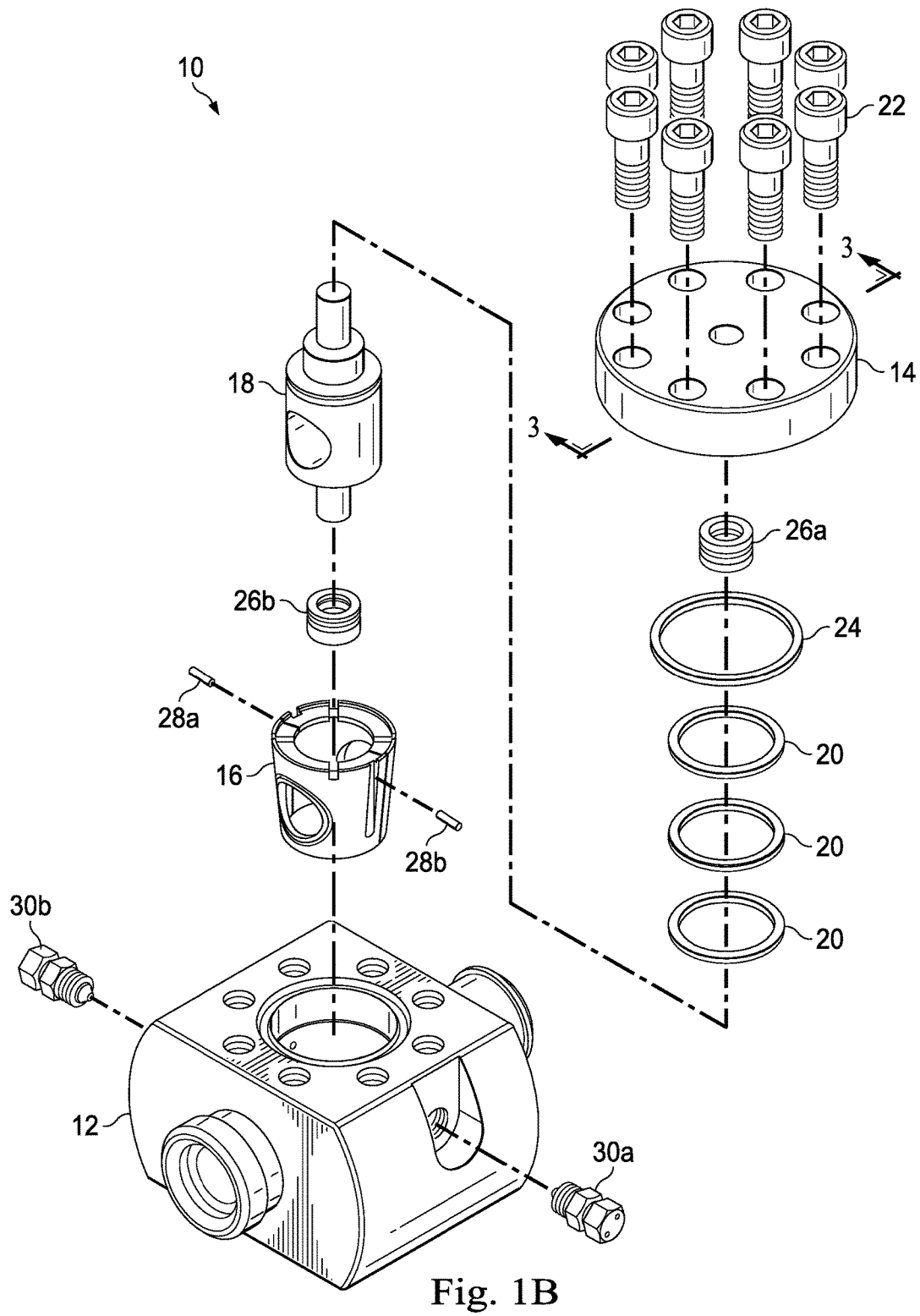
FIG. 1B is a perspective view of the plug valve of FIG. 1A in a disassembled state, according to an exemplary embodiment.

Referring initially to FIGS. 1A and 1B, an exemplary embodiment of a plug valve, generally referred to by the reference numeral 10, is illustrated in assembled and disassembled states, respectively. The plug valve 10 includes a valve body 12, a bonnet 14, a tapered insert 16, a plug 18, and a biasing member 20. The plug 18 is adapted to extend within and engage the tapered insert 16, which insert, in turn, is adapted to extend within and engage the valve body 12. The bonnet 14 is adapted to be connected to the valve body 12 via, for example, a plurality of fasteners 22, to secure the tapered insert 16, the plug 18, and the biasing member 20 within the valve body 12. When the bonnet 14 is connected to the valve body 12, the biasing member 20 is adapted to be constrained between the bonnet 14 and the tapered insert 16. As a result, the biasing member 20 urges the tapered insert 16 into engagement with the valve body 12, as will be discussed in further detail below.

A metal ring seal 24 is adapted to be crushed between the bonnet 14 and the valve body 12 when the bonnet 14 is connected to the valve body 12. Moreover, a pair of packing elements 26a and 26b are adapted to sealingly engage respective portions of the valve body 12 and the plug 18. Consequently, when the plug valve 10 is assembled, the metal ring seal 24 and the packing elements 26a and 26b prevent, or at least reduce, leakage of a fluid from the interior of the valve body 12 to atmosphere. Additionally, roll pins 28a and 28b are adapted to engage both the tapered insert 16 and the interior of the valve body 12 to prevent, or at least obstruct, turning, shifting, and/or rotation of the tapered insert 16 relative to the valve body 12. Finally, grease fittings 30a and 30b are adapted to be connected to the valve body 12 to permit the pumping of a lubrication fluid into the valve body 12. The lubrication fluid lubricates and seals the interface between the plug 18 and the tapered insert 16. The grease fittings 30a and 30b may include external threads to threadably engage a portion of the valve body 12.

Figure 2A:
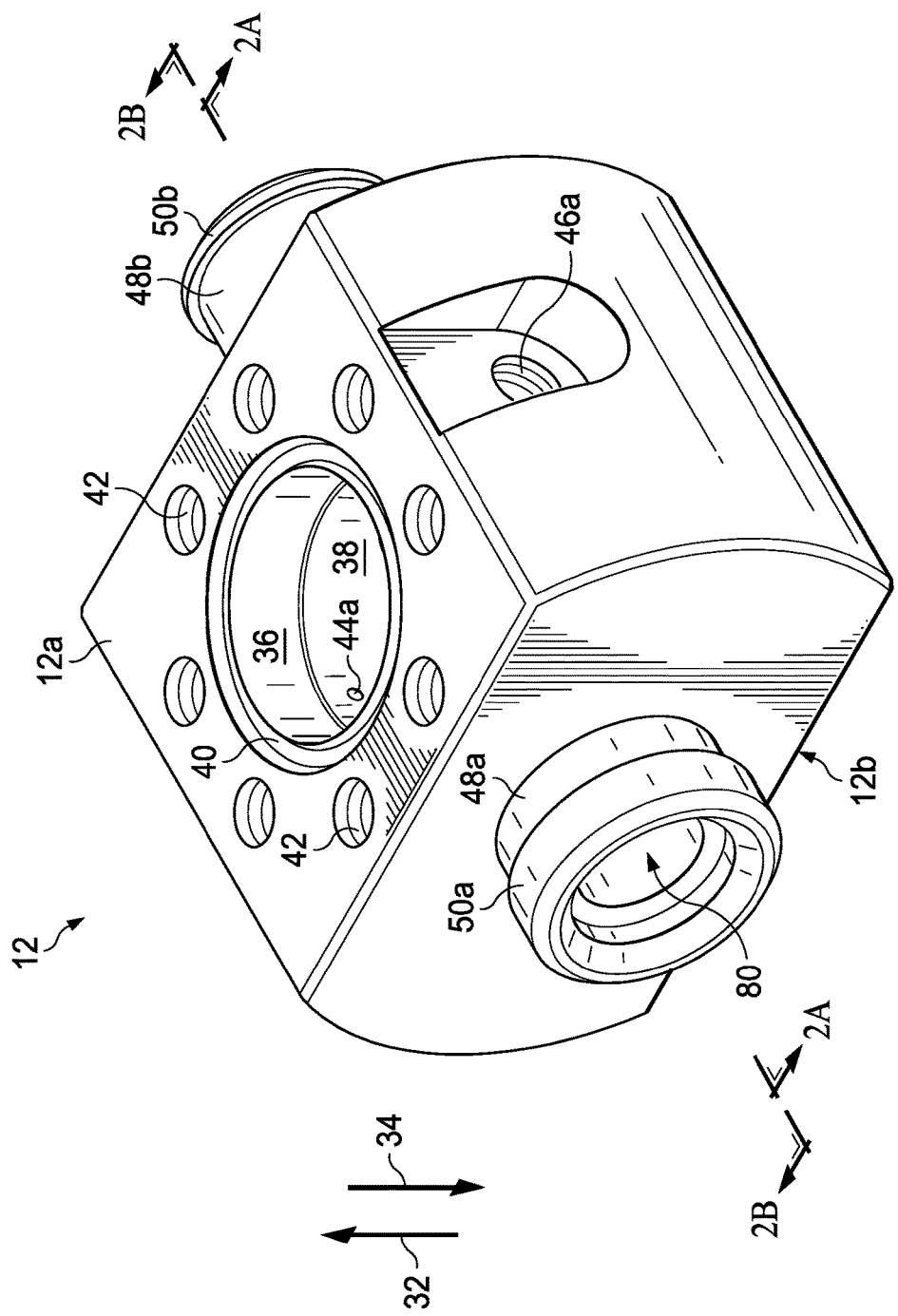
FIG. 2A is a perspective view of the valve body of FIGS. 1A and 1B, according to an exemplary embodiment.
Figure 2B:
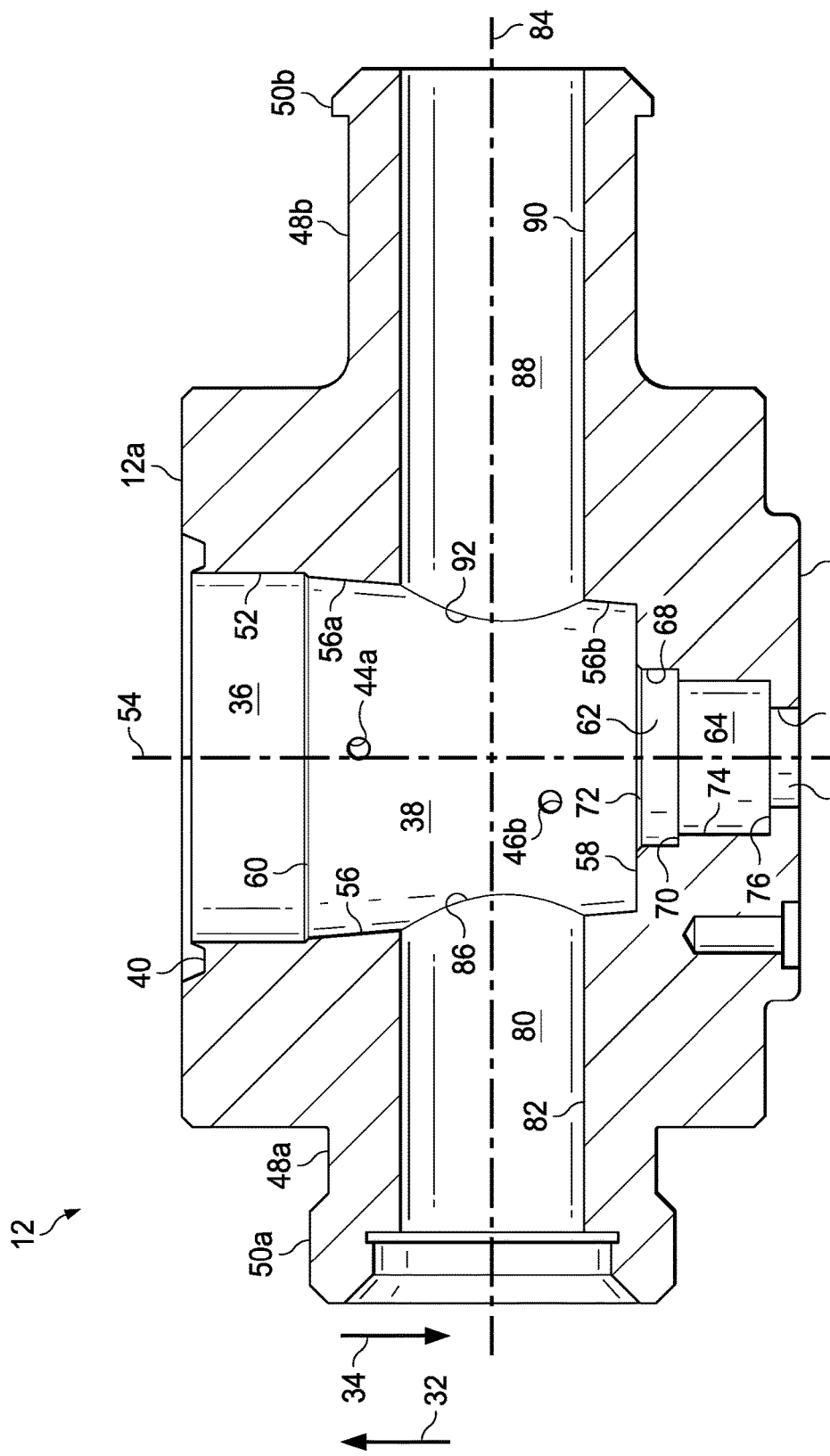
FIG. 2B is a sectional view of the valve body taken along line 2B-2B of FIG. 2A, according to an exemplary embodiment.
Figure 2C:
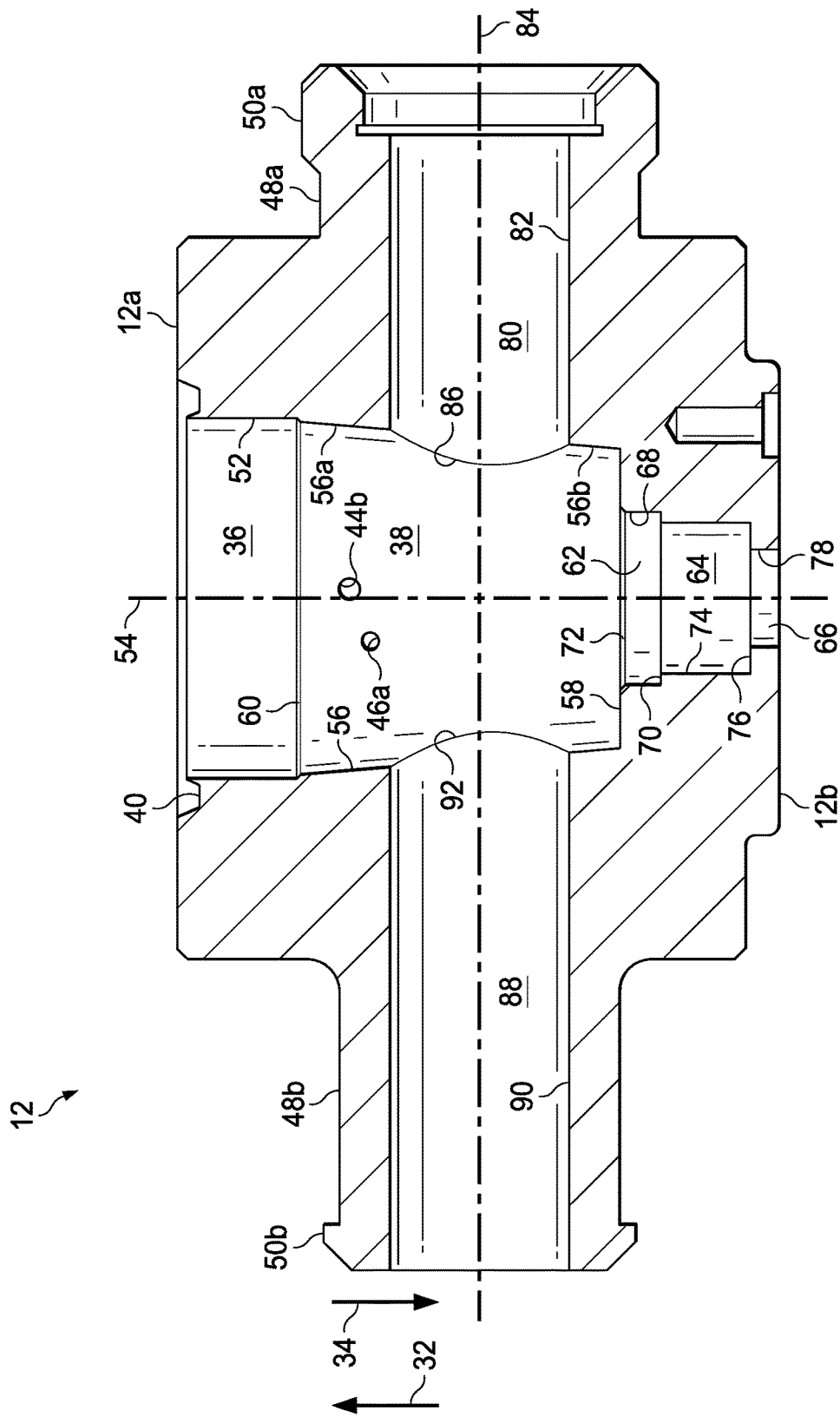
FIG. 2C is another sectional view of the valve body taken along line 2C-2C of FIG. 2A, according to an exemplary embodiment.

Referring to FIGS. 2A-2C, an exemplary embodiment of the valve body 12 is illustrated, the valve body 12 defining opposing faces 12a and 12b. The face 12a faces in an axial direction 32. In contrast, the face 12b faces in an axial direction 34, which is substantially opposite the axial direction 32. In several exemplary embodiments, the opposing faces 12a and 12b are spaced in a parallel relation. A generally cylindrical opening 36 is formed in the face 12a of the valve body 12. Further, a generally frusto-conical cavity 38 is formed in the valve body 12, contiguous with the opening 36. The opening 36 and the cavity 38 will be described in further detail below. Additionally, an annular groove 40 is formed in the face 12a of the valve body 12. The annular groove 40 extends concentrically about the opening 36 and is adapted to receive the metal ring seal 24. A plurality of threaded holes 42 are formed in the face 12a of the valve body 12. The threaded holes 42 are distributed concentrically about the annular groove 40 and are adapted to receive respective ones of the fasteners 22 to connect the bonnet 14 to the valve body 12.

One or more holes 44a (shown in FIGS. 2A and 2B) and 44b (shown in FIG. 2C) are formed in the interior of the valve body 12. The holes 44a and 44b are adapted to receive the roll pins 28a and 28b, respectively, to prevent, or at least obstruct, turning, shifting, and/or rotation of the tapered insert 16 relative to the valve body 12. The holes 44a and 44b may retain the roll pins 28a and 28b via a friction fit, a threaded fit, or the like. Additionally, one or more lubrication ports 46a (shown in FIGS. 2A and 2C) and 46b (shown in FIG. 2B) are formed in the valve body 12 from the exterior thereof and into the cavity 38. The lubrication ports 46a and 46b receive the grease fittings 30a and 30b, respectively, and permit the pumping of a lubrication fluid into the valve body 12. The lubrication fluid lubricates the interface between the plug 18 and the tapered insert 16. Moreover, the lubrication fluid establishes a seal between the plug 18 and the tapered insert 16, as will be discussed in further detail below. The lubrication ports 46a and 46b may include internal threads adapted to be threadably engaged by the external threads of the grease fittings 30a and 30b. Additionally, one or more lubrication lines (not shown) may be placed in fluid communication with the lubrication ports 46a and 46b to provide the lubrication fluid to the interior of the valve body 12 during operation of the plug valve 10.

A pair of generally cylindrical protrusions 48a and 48b extend from the exterior of the valve body 12 on opposing sides thereof. In several exemplary embodiments, the protrusions 48a and 48b are co-axial. In several exemplary embodiments, the protrusions 48a and 48b are, include, or are part of, the valve body 12. A pair of fluid-line connectors 50a and 50b are included at the respective distal ends of the protrusions 48a and 48b. In several exemplary embodiments, the fluid-line connector 50a is the female half of a hammer union. Alternatively, the fluid-line connector 50a may be the male half of a hammer union. In several exemplary embodiments, the fluid-line connector 50b is the male half of a hammer union. Alternatively, the fluid-line connector 50b may be the female half of a hammer union. Furthermore, one or both of the fluid-line connectors 50a and 50b may be some other type of connector that is not the male or female half of a hammer union, such as, for example, a hammerless union, a flange, another fluid-line connector, or any combination thereof.

As shown in FIGS. 2B and 2C, the opening 36 defines an interior surface 52 extending about a longitudinal center axis 54. The cavity 38, which is contiguous with the opening 36, defines a tapered interior surface 56 and an annular interior surface 58, each extending about the longitudinal center axis 54. The tapered interior surface 56 defines opposing end portions 56a and 56b. Moreover, the tapered interior surface 56 is tapered inwardly towards the longitudinal center axis 54, from the end portion 56a to the end portion 56b thereof. The annular interior surface 58 adjoins the end portion 56b of the tapered interior surface 56 and faces in the axial direction 32.

The lubrication port 46a extends from the exterior of the valve body 12, through the tapered interior surface 56, and into the cavity 38, as shown in FIG. 2C. Similarly, the lubrication port 46b extends from the exterior of the valve body 12, through the tapered interior surface 56, and into the cavity 38, as shown in FIG. 2B. In several exemplary embodiments, the lubrication port 46a extends through the valve body 12 and into the cavity 38 at a position above the lubrication port 46b. Moreover, in several exemplary embodiments, the lubrication ports 46a and 46b extend through the valve body 12 and into the cavity 38 on opposing sides of the valve body 12.

The interior surface 52 of the opening 36 is located adjacent the end portion 56a of the tapered interior surface 56 of the cavity 38. In several exemplary embodiments, the interior surface 52 has a slightly larger diameter than the end portion 56a of the tapered interior surface 56. Accordingly, a sloping annular lip 60 is formed in the valve body 12 at the border between the interior surfaces 52 and 56. In several exemplary embodiments, the annular lip 60 eases the installation of the tapered insert 16 into the cavity 38.

A trio of contiguous bores 62, 64, and 66 are formed in the valve body 12. The bore 62 is formed in the annular interior surface 58 of the valve body 12 and is contiguous with the cavity 38. Moreover, the bore 62 defines an interior surface 68 and an annular shoulder 70, each extending about the longitudinal center axis 54. The interior surface 68 adjoins both the annular shoulder 70 and the annular interior surface 58. The annular shoulder 70 faces in the axial direction 32. In several exemplary embodiments, a sloping annular lip 72 is formed in the valve body 12 at the border between the interior surface 68 and the annular interior surface 58. Further, the bore 64 is contiguous with, and has a smaller diameter than, the bore 62. The bore 64 defines an interior surface 74 and an annular shoulder 76, each extending about the longitudinal center axis 54. The interior surface 74 adjoins both the annular shoulder 76 and the annular shoulder 70 defined by the bore 62. The annular shoulder 76 faces in the axial direction 32. Further still, the bore 66 is contiguous with, and has a smaller diameter than, the bore 64. The bore 66 defines an interior surface 78 that extends about the longitudinal center axis 54. The interior surface 78 adjoins both the face 12b of the valve body 12 and the annular shoulder 76 defined by the bore 64.

A fluid passage 80 extends through the protrusion 48a and into the valve body 12, intersecting the cavity 38. Consequently, a fluid may be communicated through the fluid passage 80 to and/or from the cavity 38 by, for example, connecting a fluid line (not shown) to the protrusion 48a via the fluid-line connector 50a. The fluid passage 80 defines a cylindrical surface 82 extending about a longitudinal center axis 84. Moreover, at the junction of the fluid passage 80 and the cavity 38, the interior of the valve body 12 defines an intersection 86. Similarly, a fluid passage 88 extends through the protrusion 48b and into the valve body 12, intersecting the cavity 38. Consequently, a fluid may be communicated through the fluid passage 88 to and/or from the cavity 38 by, for example, connecting a fluid line (not shown) to the protrusion 48b via the fluid-line connector 50b. The fluid passage 88 defines a cylindrical surface 90 extending about the longitudinal center axis 84. Moreover, at the junction of the fluid passage 88 and the cavity 38, the interior of the valve body 12 defines an intersection 92. In several exemplary embodiments, the longitudinal center axis 84 lies in a plane that is substantially perpendicular to a plane in which the longitudinal center axis 54 lies. In several exemplary embodiments, the longitudinal center axis 84 intersects the longitudinal center axis 52.

Figure 3:
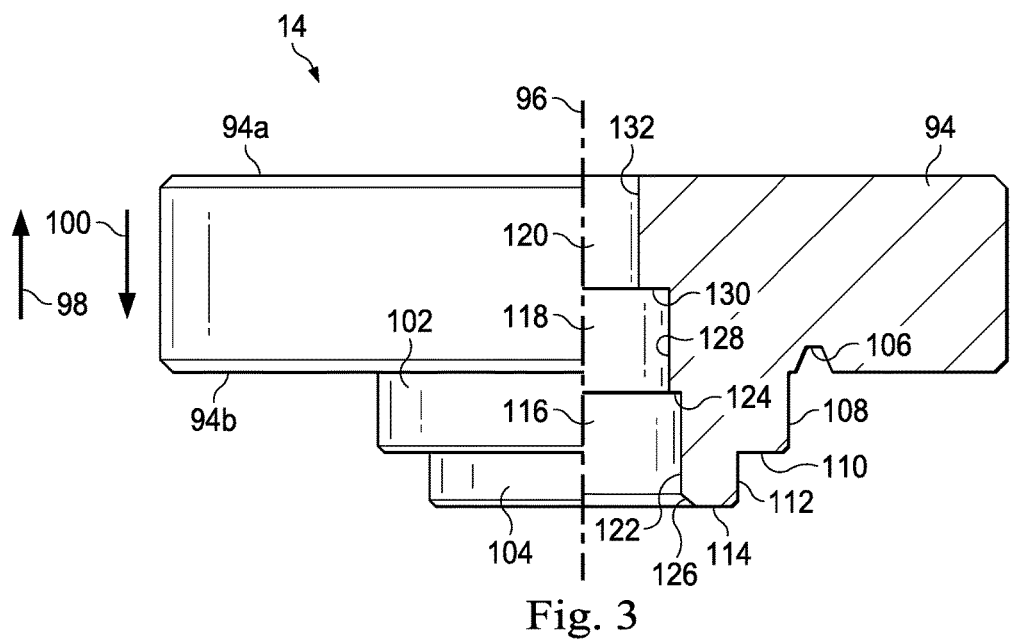
FIG. 3 is a partial sectional view of the bonnet taken along line 3-3 of FIG. 1B, according to an exemplary embodiment.

Referring now to FIG. 3, an exemplary embodiment of the bonnet 14 is illustrated. The bonnet 14 includes a generally cylindrical flange 94 that extends about a longitudinal center axis 96 and defines opposing faces 94a and 94b. The face 94a faces in an axial direction 98. In contrast, the face 94b faces in an axial direction 100, which is substantially opposite the axial direction 98. The face 94b is adapted to abut, or nearly abut, the face 12a of the valve body 12 when the bonnet 14 is connected to the valve body 12. In several exemplary embodiments, when the bonnet 14 is connected to the valve body 12 so that the end face 94b of the flange 94 abuts, or nearly abuts, the face 12a of the valve body 12, the bonnet 14 is axially immovable relative to the valve body 12.

A pair of generally cylindrical protrusions 102 and 104 extend from the face 94b of the flange 94 in the axial direction 100. The protrusion 102 extends from the face 94b and is contiguous with the flange 94. An annular groove 106 is formed in the face 94b of the flange 94, concentrically about the protrusion 102. The annular groove 106 is adapted to receive the metal ring seal 24. Moreover, a plurality of holes (not shown) are formed through the flange 94. The holes (not shown) are distributed concentrically about the annular groove 106 and are adapted to accommodate respective ones of the fasteners 22 to connect the bonnet 14 to the valve body 12. Accordingly, when the bonnet 14 is connected to the valve body 12 via the fasteners 22, the metal ring seal 24 is adapted to be crushed within the respective annular grooves 106 and 40 of the bonnet 14 and the valve body 12.

The protrusion 102 defines an exterior surface 108 and an annular shoulder 110, each extending about the longitudinal center axis 96. The exterior surface 108 adjoins both the annular shoulder 110 and the face 94b defined by the flange 94. Moreover, when the bonnet 14 is connected to the valve body 12, the exterior surface 108 is adapted to engage, or nearly engage, at least a portion of the interior surface 52 defined by the opening 36. The annular shoulder 110 faces in the axial direction 100 and is adapted to constrain the biasing member 20, as will be discussed in further detail below.

The protrusion 104 is contiguous with, and has a smaller diameter than, the protrusion 102. The protrusion 104 defines an exterior surface 112 and an end face 114, each extending about the longitudinal center axis 96. The exterior surface 112 adjoins both the end face 114 and the annular shoulder 110 defined by the protrusion 102. Moreover, the exterior surface 112 is adapted to extend within at least a portion of the biasing member 20. The end face 114 faces in the axial direction 100 and is adapted to abut, or nearly abut, the tapered insert 16, as will be discussed in further detail below.

A trio of contiguous bores 116, 118, and 120 are formed in the bonnet 14. The bore 116 is formed in the end face 114 of the protrusion 104. The bore 116 defines an interior surface 122 and an annular shoulder 124, each extending about the longitudinal center axis 96. The interior surface 122 adjoins both the annular shoulder 124 and the end face 114 of the protrusion 104. The annular shoulder 124 faces in the axial direction 100. In several exemplary embodiments, a sloping annular lip 126 is formed in the bonnet 14 at the border between the interior surface 122 and the end face 114.

Further, the bore 118 is contiguous with, and has a smaller diameter than, the bore 116. The bore 118 defines an interior surface 128 and an annular shoulder 130, each extending about the longitudinal center axis 96. The interior surface 128 adjoins both the annular shoulder 130 and the annular shoulder 124 defined by the bore 116. The annular shoulder 130 faces in the axial direction 100. Further still, the bore 120 is contiguous with, and has a smaller diameter than, the bore 118. The bore 120 defines an interior surface 132 that extends about the longitudinal center axis 96. The interior surface 132 adjoins both the end face 94a defined by the flange 94 and the annular shoulder 130 defined by the bore 118.

Figure 4:
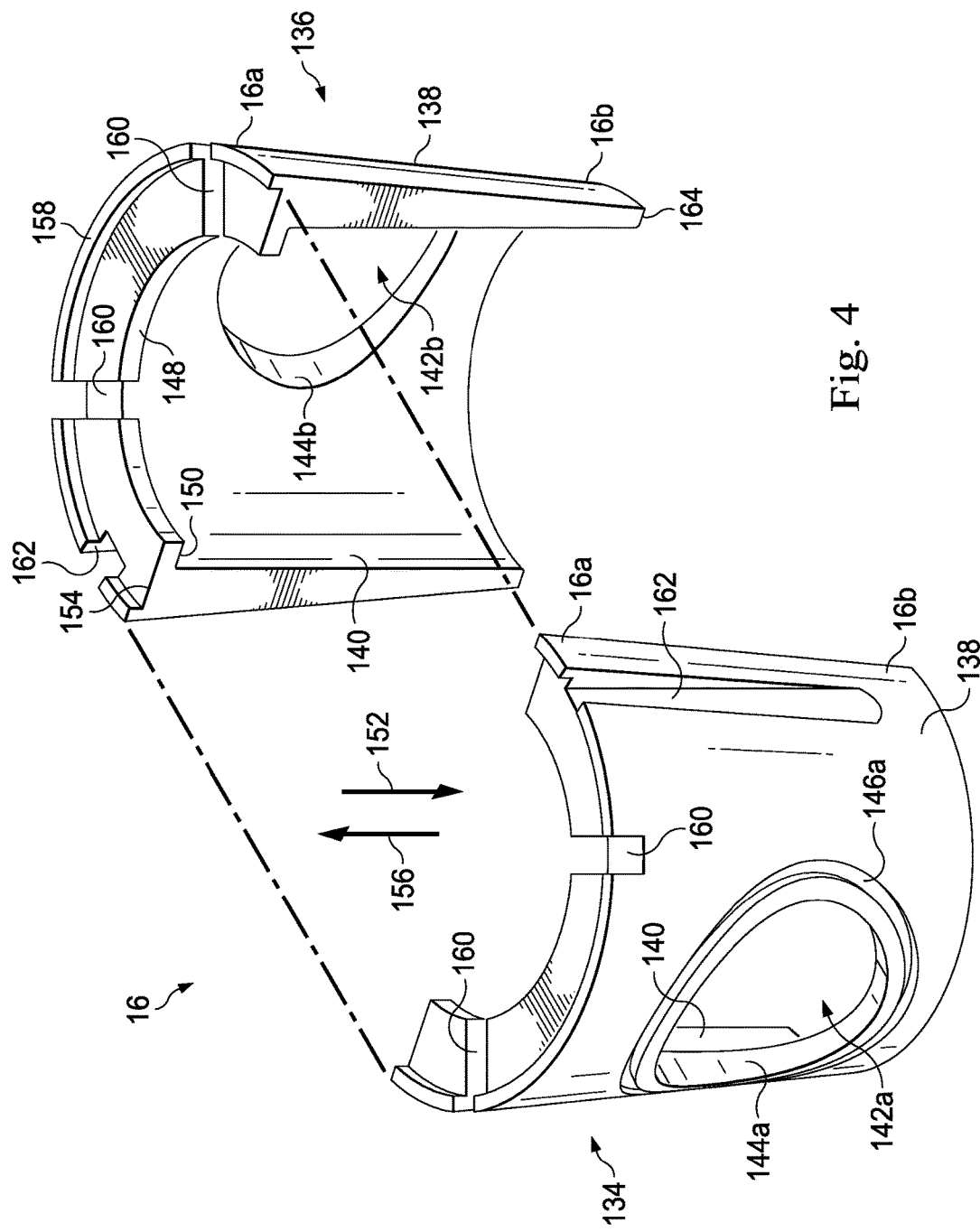
FIG. 4 is a perspective view of the tapered insert of FIGS. 1A and 1B in a disassembled state, according to an exemplary embodiment.

Referring to FIG. 4, an exemplary embodiment of the tapered insert 16 is illustrated. The tapered insert 16 is split longitudinally so as to include opposing sections 134 and 136. The opposing sections 134 and 136 are adapted to abut, or nearly abut, one another along a longitudinal plane. Moreover, the tapered insert 16 defines opposing end portions 16a and 16b. The tapered insert 16 includes an exterior surface 138 that is tapered inwardly from the end portion 16a to the end portion 16b thereof. The exterior surface 138 is adapted to conform to the tapered interior surface 56 defined by the cavity 38 of the valve body 12. In contrast, the tapered insert 16 includes an interior surface 140 that outlines a generally cylindrical profile when the sections 134 and 136 of the tapered insert 16 abut, or nearly abut, one another. A pair of fluid passages 142a and 142b are formed through the sections 134 and 136, respectively, of the tapered insert 16. The fluid passages 142a and 142b are substantially co-axial with one another when the sections 134 and 136 of the tapered insert 16 abut, or nearly abut, one another. Moreover, in several exemplary embodiments, the fluid passages 142a and 142b define a common axis that intersects the longitudinal plane, along which the sections 134 and 136 abut one another, at an oblique angle.

The fluid passage 142a defines a cylindrical surface 144a in the section 134 of the tapered insert 16. When the section 134 of the tapered insert 16 conforms to the tapered interior surface 56 of the cavity 38, the cylindrical surface 144a is substantially aligned with the cylindrical surface 82 formed in the valve body 12. As a result, the fluid passage 80 is in fluid communication with the fluid passage 142a. Moreover, a groove 146a is formed in the exterior surface 138 of the section 134. The groove 146a extends concentrically about the fluid passage 142a and is adapted to accommodate an annular seal (not shown), which seal, in turn, sealingly engages the valve body 12 about the intersection 86.

Similarly, the fluid passage 142b defines a cylindrical surface 144b in the section 136 of the tapered insert 16. When the section 136 of the tapered insert 16 conforms to the tapered interior surface 56 of the cavity 38, the cylindrical surface 144b is substantially aligned with the cylindrical surface 90 formed in the valve body 12. As a result, the fluid passage 88 is in fluid communication with the fluid passage 142b. Moreover, a groove 146b (not visible in FIG. 4) is formed in the exterior surface 138 of the section 136. The groove 146b extends concentrically about the fluid passage 142b and is adapted to accommodate an annular seal (not shown), which seal, in turn, sealingly engages the valve body 12 about the intersection 92.

An annular tongue 148 extends along the tapered insert 16 at the end portion 16a thereof, extending inwardly beyond the interior surface 140. The annular tongue 148 defines an annular shoulder 150 adjoining the interior surface 140 and facing in an axial direction 152. Further, an end face 154 is defined at the end portion 16a of the tapered insert 16. In several exemplary embodiments, the end face 154 is at least partially defined by the annular tongue 148. The end face 154 faces in an axial direction 156, which is substantially opposite the axial direction 152. The end face 154 is adapted to constrain the biasing member 20, as will be discussed in further detail below. Moreover, an annular rim 158 is formed by the extension of the exterior surface 138 beyond the end face 154. The annular rim 158 engages, or nearly engages, the biasing member 20 when the plug valve 10 is assembled.

Further, one or more notches 160 extend radially through the annular tongue 148, the annular rim 158, and the exterior surface 138 at the end portion 16*a* of the tapered insert 16. In several exemplary embodiments, each of the sections 134 and 136 of the tapered insert 16 includes one or more of the notches 160. In several exemplary embodiments, the notches 160 are evenly distributed about the insert 16.

Further still, one or more longitudinal grooves 162 are formed into the tapered insert 16. Each of the longitudinal grooves 162 extends longitudinally along at least a portion of the exterior surface 138 of the tapered insert 16 and through the annular rim 158. In several exemplary embodiments, each of the sections 134 and 136 of the tapered insert 16 includes one of the longitudinal grooves 162. In several exemplary embodiments, the longitudinal grooves 162 are located on substantially opposite sides of the tapered insert 16 when the sections 134 and 136 abut, or nearly abut, one another. The longitudinal grooves 162 are adapted to receive respective ones of the roll pins 28*a* and 28*b* to prevent, or at least obstruct, turning, shifting, and/or rotation of the tapered insert 16 relative to the valve body 12.

Finally, an end face 164 is defined at the end portion 16*b* of the tapered insert 16. The end face 164 faces in the axial direction 152 and is adapted to abut, or nearly abut, at least a portion of the annular interior surface 58 defined by the cavity 38.

Figure 5:
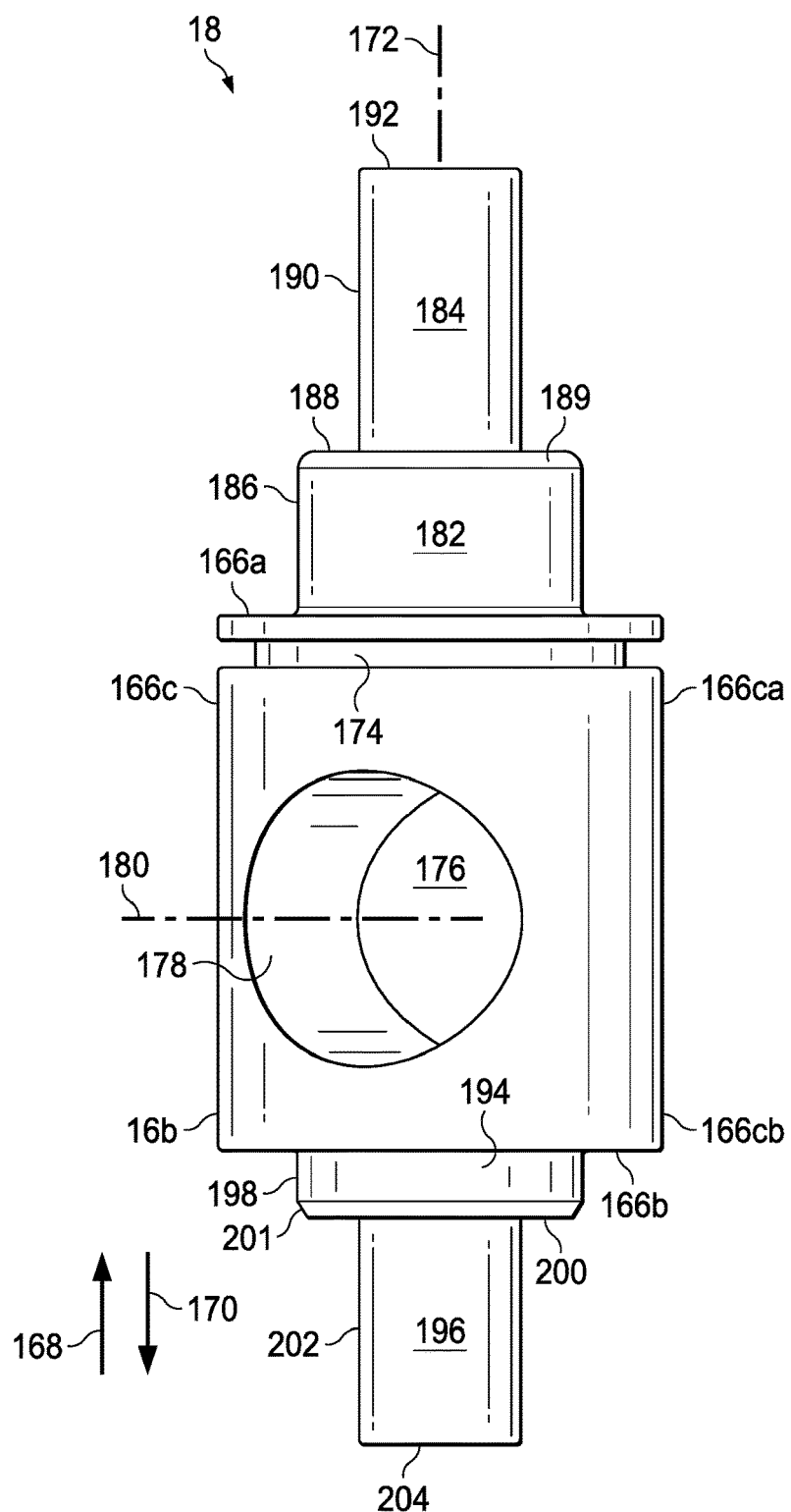
FIG. 5 is an elevational view of the plug of FIGS. 1A and 1B, according to an exemplary embodiment.

Referring now to FIG. 5, an exemplary embodiment of the plug 18 is illustrated. The plug 18 includes a valve cylinder 166 that defines opposing end faces 166*a* and 166*b* adjoining a generally cylindrical exterior surface 166*c*. The end face 166*a* faces in an axial direction 168. Moreover, the end face 114 of the bonnet 14 is adapted to abut, or nearly abut, the end face 166*a*. In contrast, the end face 166*b* faces in an axial direction 170, which is substantially opposite the axial direction 168. The end face 166*b* is adapted to abut, or nearly abut, at least a portion of the annular interior surface 58 defined by the cavity 38. Further, the exterior surface 166*c* extends about a longitudinal center axis 172 and defines opposing end portions 166*ca* and 166*cb*. When the respective sections 134 and 136 of the tapered insert 16 abut, or nearly abut, one another, the interior surface 140 of the tapered insert 16 is adapted to conform to the exterior surface 166*c* of the valve cylinder 166.

An annular groove 174 is formed in the exterior surface 166*c* of the valve cylinder 166 at the end portion 166*ca* thereof. Alternatively, the annular groove 174 may be formed at the end portion 166*cb* of the valve cylinder 166. The annular groove 174 is adapted to receive the annular tongue 148 of the tapered insert 16 when the interior surface 140 of the tapered insert 16 conforms to the exterior surface 166*c* of the valve cylinder 166. Accordingly, when the plug 18 is subjected to external forces that tend to move it axially, such as, for example, hydraulic lift, the tapered insert 16 remains in a fixed position relative to the plug 18. Moreover, when the tapered insert 16 is subject to external forces that tend to move it axially, such as, for example, an axial force imparted by the biasing member 20, the plug 18 remains in a fixed position relative to the tapered insert 16. In several exemplary embodiments, instead of the annular groove 174 being formed in the valve cylinder 166 and the annular tongue 148 extending along the tapered insert 16, the annular groove 174 is formed in the tapered insert 16 and the annular tongue extends along the valve cylinder 166.

A fluid passage 176 extends through the valve cylinder 166. The fluid passage 176 defines a cylindrical surface 178 extending about a longitudinal center axis 180. When the interior surface 140 of the tapered insert 16 conforms to the exterior surface 166*c* of the valve cylinder 166, the cylindrical surface 178 of the plug 18 is substantially aligned with the cylindrical surfaces 144*a* and 144*b* of the tapered insert 16 and the cylindrical surfaces 82 and 90 of the valve body 12. As a result, the fluid passage 176 of the plug 18 is in fluid communication with the fluid passages 80 and 88 of the valve body 12 via the fluid passages 142*a* and 142*b*, respectively, of the tapered insert 16. In several exemplary embodiments, the longitudinal center axis 180 lies in a plane that is substantially perpendicular to a plane in which the longitudinal center axis 172 lies. In several exemplary embodiments, the longitudinal center axis 180 intersects the longitudinal center axis 172.

In an exemplary embodiment, the plug 18 includes a pair of generally cylindrical protrusions 182 and 184 extending from the end face 166*a* of the valve cylinder 166 in the axial direction 168.

The protrusion 182 extends from the end face 166*a* and is contiguous with the valve cylinder 166. The protrusion 182 defines an exterior surface 186 and an annular shoulder 188, each extending about the longitudinal center axis 172. The exterior surface 186 adjoins both the annular shoulder 188 and the end face 166*a* defined by the valve cylinder 166. Moreover, the exterior surface 186 is adapted to engage, or nearly engage, the interior surface 122 of the bonnet 14. The annular shoulder 188 faces in the axial direction 168. At least a portion of the annular shoulder 188 is adapted to abut, or nearly abut, the annular shoulder 124 of the bonnet 14. In several exemplary embodiments, a sloping annular lip 189 is formed in the plug 18 at the border between the exterior surface 186 and the annular shoulder 188. The annular lip 189 is adapted to engage the annular lip 126 of the bonnet 14 to ease the installation of the protrusion 182 into the bore 116 of the bonnet 14.

The protrusion 184 is contiguous with, and has a smaller diameter than, the protrusion 182. The protrusion 184 defines an exterior surface 190 and an end face 192, each extending about the longitudinal center axis 172. The exterior surface 190 adjoins both the end face 192 and the annular shoulder 188 defined by the protrusion 182. Moreover, at least a portion of the exterior surface 190 is adapted to engage, or nearly engage, the interior surface 132 of the bonnet 14. The end face 192 faces in the axial direction 168. The packing element 26*a* is adapted to be constrained between the annular shoulder 130 of the bonnet 14 and at least a portion of the annular shoulder 188 of the protrusion 182. Constrained as such, the packing element 26*a* sealingly engages both the interior surface 128 of the bonnet 14 and at least a portion of the exterior surface 190 of the protrusion 184 to prevent, or at least reduce, leakage of a fluid from the interior of the valve body 12 to atmosphere.

Similarly, in an exemplary embodiment, the plug 18 includes a pair of generally cylindrical protrusions 194 and 196 extending from the end face 166*b* of the valve cylinder 166 in the axial direction 170.

The protrusion 194 extends from the end face 166*b* and is contiguous with the valve cylinder 166. The protrusion 194 defines an exterior surface 198 and an annular shoulder 200, each extending about the longitudinal center axis 172. The exterior surface 198 adjoins both the annular shoulder 200 and the end face 166b defined by the valve cylinder 166. Moreover, the exterior surface 198 is adapted to engage, or nearly engage, the interior surface 68 of the valve body 12. The annular shoulder 200 faces in the axial direction 170. At least a portion of the annular shoulder 200 is adapted to abut, or nearly abut, the annular shoulder 70 of the valve body 12. In several exemplary embodiments, a sloping annular lip 201 is formed in the plug 18 at the border between the exterior surface 198 and the annular shoulder 200. The annular lip 201 is adapted to engage the annular lip 72 of the valve body 12 to ease the installation of the protrusion 194 into the bore 62 of the valve body 12.

The protrusion 196 is contiguous with, and has a smaller diameter than, the protrusion 194. The protrusion 196 defines an exterior surface 202 and an end face 204, each extending about the longitudinal center axis 172. The exterior surface 202 adjoins both the end face 204 and the annular shoulder 200 defined by the protrusion 194. Moreover, at least a portion of the exterior surface 202 is adapted to engage, or nearly engage, the interior surface 78 of the valve body 12. The end face 204 faces in the axial direction 170. The packing element 26b is adapted to be constrained between the annular shoulder 76 of the valve body 12 and at least a portion of the annular shoulder 200 of the protrusion 194. Constrained as such, the packing element 26b sealingly engages both the interior surface 74 of the valve body 12 and at least a portion of the exterior surface 202 of the protrusion 196 to prevent, or at least reduce, leakage of a fluid from the interior of the valve body 12 to atmosphere. In several exemplary embodiments, a socket 206 (visible in FIG. 7) is formed in the end face 204 of the plug 18. The socket 206 is adapted to receive a tool (not shown) such as, for example, a handle or a wheel, to rotate the plug 18, as will be discussed in further detail below.

Figure 6:
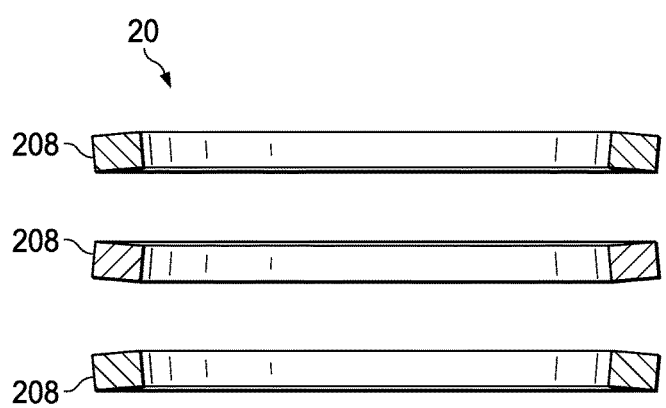
FIG. 6 is a sectional view of the biasing member of FIGS. 1A and 1B, according to an exemplary embodiment.

Referring to FIG. 6, an exemplary embodiment of the biasing member 20 is illustrated. The biasing member 20 includes a trio of frusto-conical spring washers 208 (a.k.a. Belleville washers). The spring washers 208 are adapted to be constrained between the annular shoulder 110 of the bonnet 14 and the end face 154 of the tapered insert 16. Accordingly, when the plug valve 10 is assembled, the spring washers 208 are adapted to urge the tapered insert 16 into engagement, or near engagement, with the valve body 12. Specifically, the spring washers 208 urge the end face 164 and the exterior surface 138 of the tapered insert 16 into engagement, or near engagement, with the annular interior surface 58 and the tapered interior surface 56, respectively, of the valve body 12. Although the biasing member 20 has been described as a trio of frusto-conical spring washers 208, the biasing member 20 may include any suitable number of the spring washers 208 such as, for example, one spring washer, two spring washers, four spring washers, five spring washers, six spring washers, seven spring washers, eight spring washers, nine spring washers, ten spring washers, or more. Moreover, in several exemplary embodiments, the biasing member 20 is or includes one or more components that are not the spring washers 208, such as, for example, a wave spring, a helical spring, a compressed elastic material, another type of biasing member, or any combination thereof.

Figure 7:
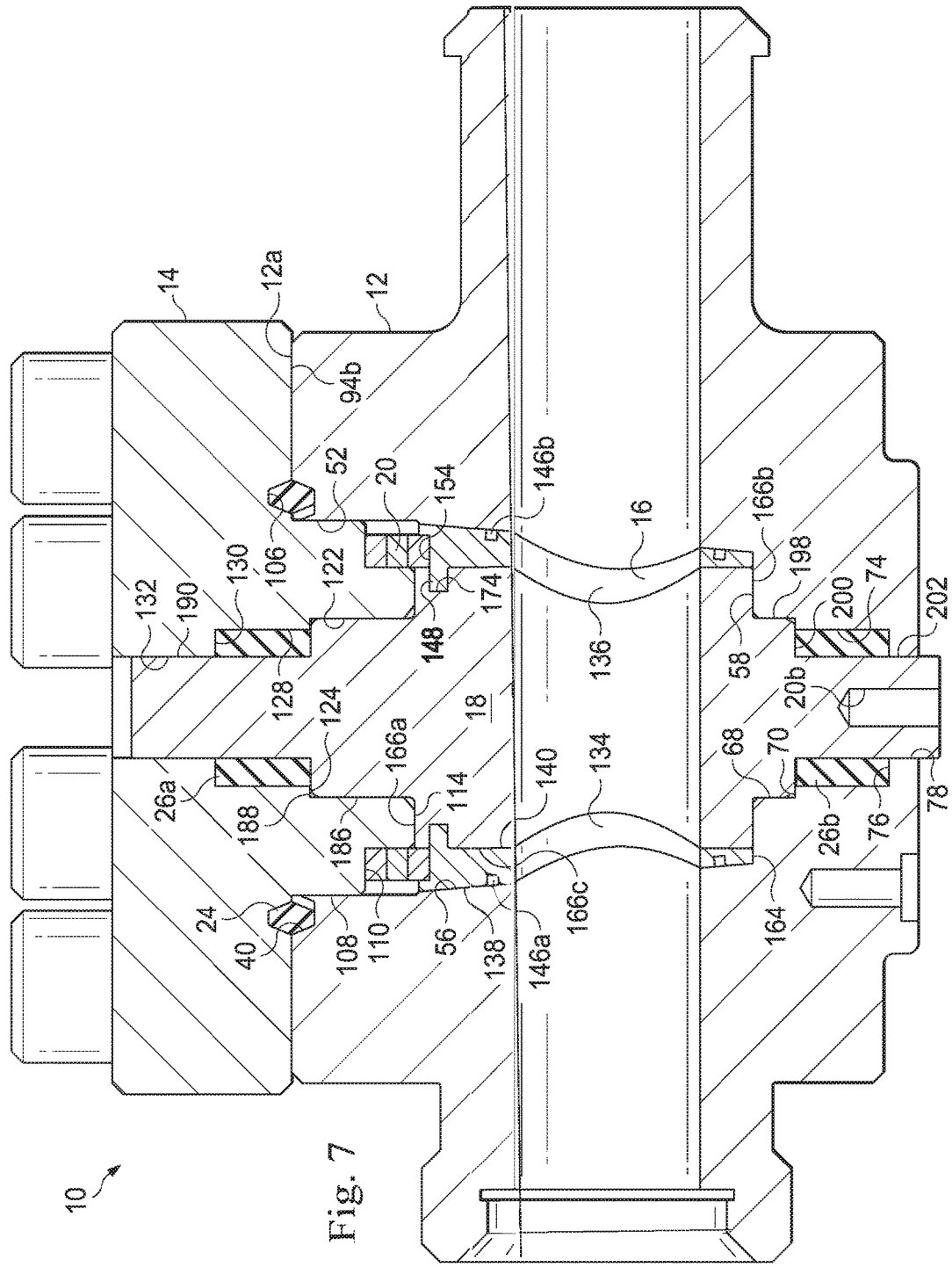
FIG. 7 is a sectional view of the plug valve taken along line 7-7 of FIG. 1A, illustrating the valve body of FIGS. 2A-2C, the bonnet of FIG. 3, the tapered insert of FIG. 4, the plug of FIG. 5, and the biasing member of FIG. 6, according to an exemplary embodiment.

Referring now to FIG. 7, the plug valve 10 is illustrated in an assembled state, including the valve body 12, the bonnet 14, the tapered insert 16, the plug 18, and the biasing member 20.

In the assembled state, the plug 18 extends within and engages the tapered insert 16, which insert, in turn, extends within and engages the valve body 12. As a result, the exterior surface 138 of the tapered insert 16 conforms to the tapered interior surface 56 of the valve body 12. The annular groove 146a in the section 134 of the tapered insert 16 accommodates a seal (not shown) that sealingly engages the valve body 12 concentrically about the intersection 86. Similarly, the annular groove 146b in the section 136 of the tapered insert 16 accommodates a seal (not shown) that sealingly engages the valve body 12 concentrically about the intersection 92. Additionally, the roll pins 28a and 28b engage both the tapered insert 16 and the interior of the valve body 12 to prevent, or at least obstruct, turning, shifting, and/or rotation of the tapered insert 16 relative to the valve body 12. Specifically, the longitudinal grooves 162 in the tapered insert 16 and the holes 44a and 44b in the valve body 12 receive respective ones of the roll pins 28a and 28b.

Further, the opposing sections 134 and 136 of the tapered insert 16 envelop the plug 18 so that the interior surface 140 of the tapered insert 16 conforms to the exterior surface 166c of the plug 18. In this position, the opposing section 134 and 136 abut, or nearly abut, one another, and the annular tongue 148 of the tapered insert 16 interlocks with the annular groove 174 of the plug 18. The interlocking of the annular tongue 148 with the annular groove 174 maintains the tapered insert 16 and the plug 18 in substantially fixed positions relative to one another. As a result, the tapered insert 16 and the plug 18 stay together when the tapered insert 16 and/or the plug 18 are subject to external forces that tend to move them axially, such as, for example, an axial force imparted to the tapered insert 16 by the biasing member 20, hydraulic lift imparted to the plug 18, or some other axial force. Although the interlocking of the annular tongue 148 with the annular groove 174 prevents, or at least obstructs, relative axial movement of the tapered insert 16 and the plug 18, the plug 18 is still permitted to rotate relative to the tapered insert 16, as will be discussed in further detail below.

Further still, the bonnet 14 is connected to the valve body 12 with the fasteners 22, thus securing the tapered insert 16, the plug 18, and the biasing member 20 within the valve body 12. As a result, the face 94b of the bonnet 14 abuts, or nearly abuts, the face 12a of the valve body 12. Moreover, the exterior surface 108 of the bonnet 14 engages, or nearly engages, at least a portion of the interior surface 52 of the valve body 12. In this position, the metal ring seal 24 is crushed within the respective annular grooves 106 and 40 of the bonnet 14 and the valve body 12. The crushed metal ring seal 24 prevents, or at least reduces, leakage of a fluid from the interior of the plug valve 10 to atmosphere.

The end face 114 of the bonnet 14 abuts, or nearly abuts, the end face 166a of the plug 18. Additionally, the annular shoulder 124 and the interior surfaces 122 and 132 of the bonnet 14 engage, or nearly engage, the annular shoulder 188 the exterior surfaces 186 and 190, respectively, of the plug 18. The packing element 26a is thus constrained between the annular shoulder 130 of the bonnet 14 and at least a portion of the annular shoulder 188 of the plug 18. In this position, the packing element 26a sealingly engages both the interior surface 128 of the bonnet 14 and at least a portion of the exterior surface 190 of the plug 18 to prevent, or at least reduce, leakage of a fluid from the interior of the plug valve 10 to atmosphere.

The end face 166b of the plug 18 abuts, or nearly abuts, the annular interior surface 58 of the valve body 12. Additionally, the annular shoulder 200 and the exterior surfaces 198 and 202 of the plug 18 engage, or nearly engage, the annular shoulder 70 and the interior surfaces 68 and 78, respectively, of the valve body 12. The packing element 26b is thus constrained between the annular shoulder 76 of the valve body 12 and at least a portion of the annular shoulder 200 of the plug 18. In this position, the packing element 26b sealingly engages both the interior surface 74 of the valve body 76 and at least a portion of the exterior surface 202 of the plug 18 to prevent, or at least reduce, leakage of a fluid from the interior of the valve body 12 to atmosphere.

In several exemplary embodiments, the protrusion 196 of the plug 18 extends through the bore 66 of the valve body 12 so that the end face 204 of the plug 18 protrudes beyond the face 12b of the valve body 12. In several exemplary embodiments, the end face 204 of the plug 18 is flush with the face 12b of the valve body 12. In several exemplary embodiments, the end face 204 of the plug 18 is disposed within the bore 66 of the valve body 12. In any event, the end face 204 of the plug 18 is accessible from the exterior of the valve body 12.

Finally, the biasing member 20 is constrained between the annular shoulder 110 of the bonnet 14 and the end face 154 of the tapered insert 16. As a result, the annular rim 158 of the tapered insert 16 engages, or nearly engages, the biasing member 20. In this position, the biasing member 20 urges the tapered insert 16 into engagement, or near engagement, with the valve body 12. Specifically, the biasing member 20 urges the end face 164 and the exterior surface 138 of the tapered insert 16 to abut, or nearly abut, the annular interior surface 58 and the tapered interior surface 56, respectively, of the valve body 12. As a result of the tapering of the tapered interior surface 56 and the exterior surface 138, the force imparted on the tapered insert 16 by the biasing member 20 resolves into a normal contacting force between the plug 18 and the opposing sections 134 and 136 of the tapered insert 16.

Figure 8A:
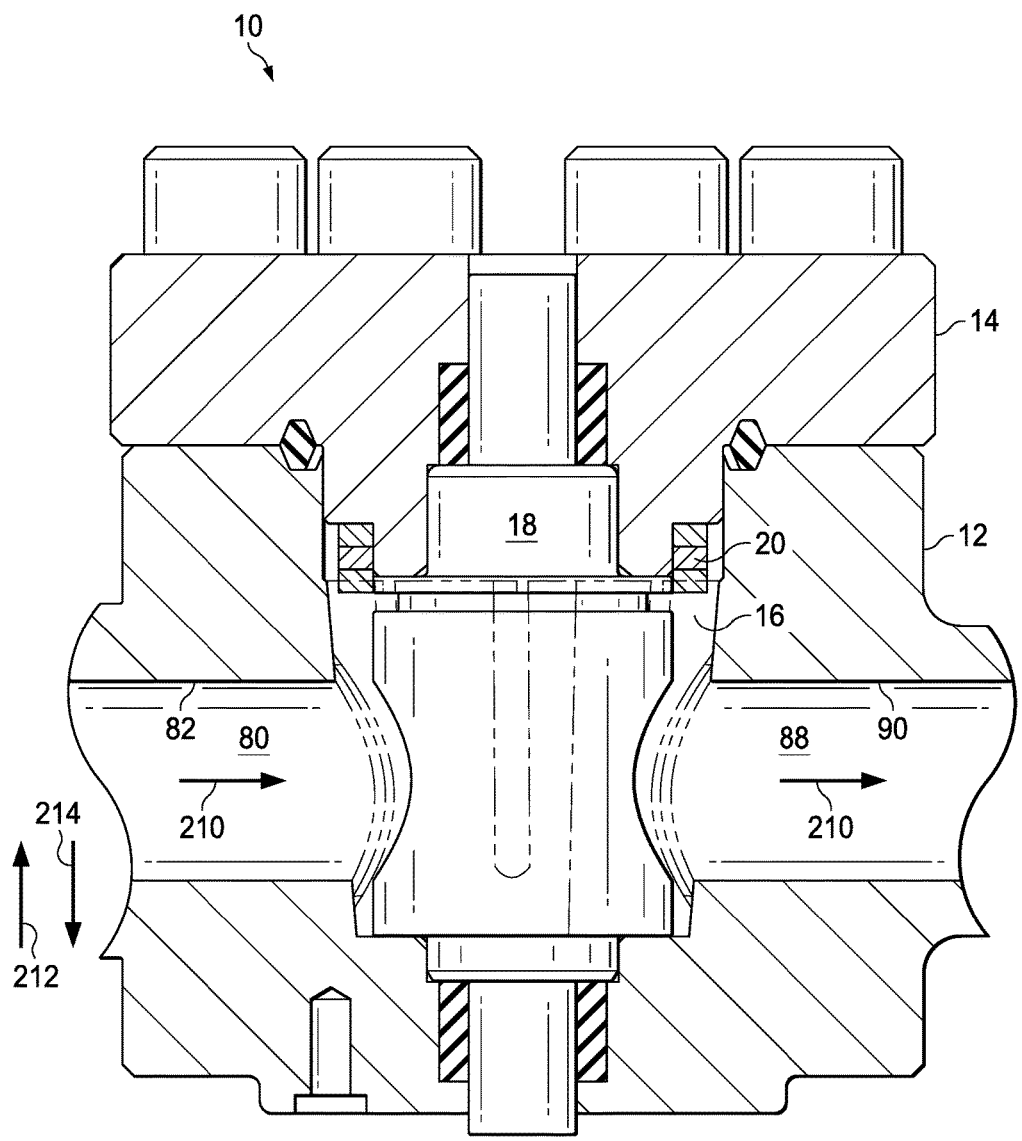
FIG. 8A is a sectional view similar to that of FIG. 7 and illustrates the plug valve in an open configuration, according to an exemplary embodiment.
Figure 8B:
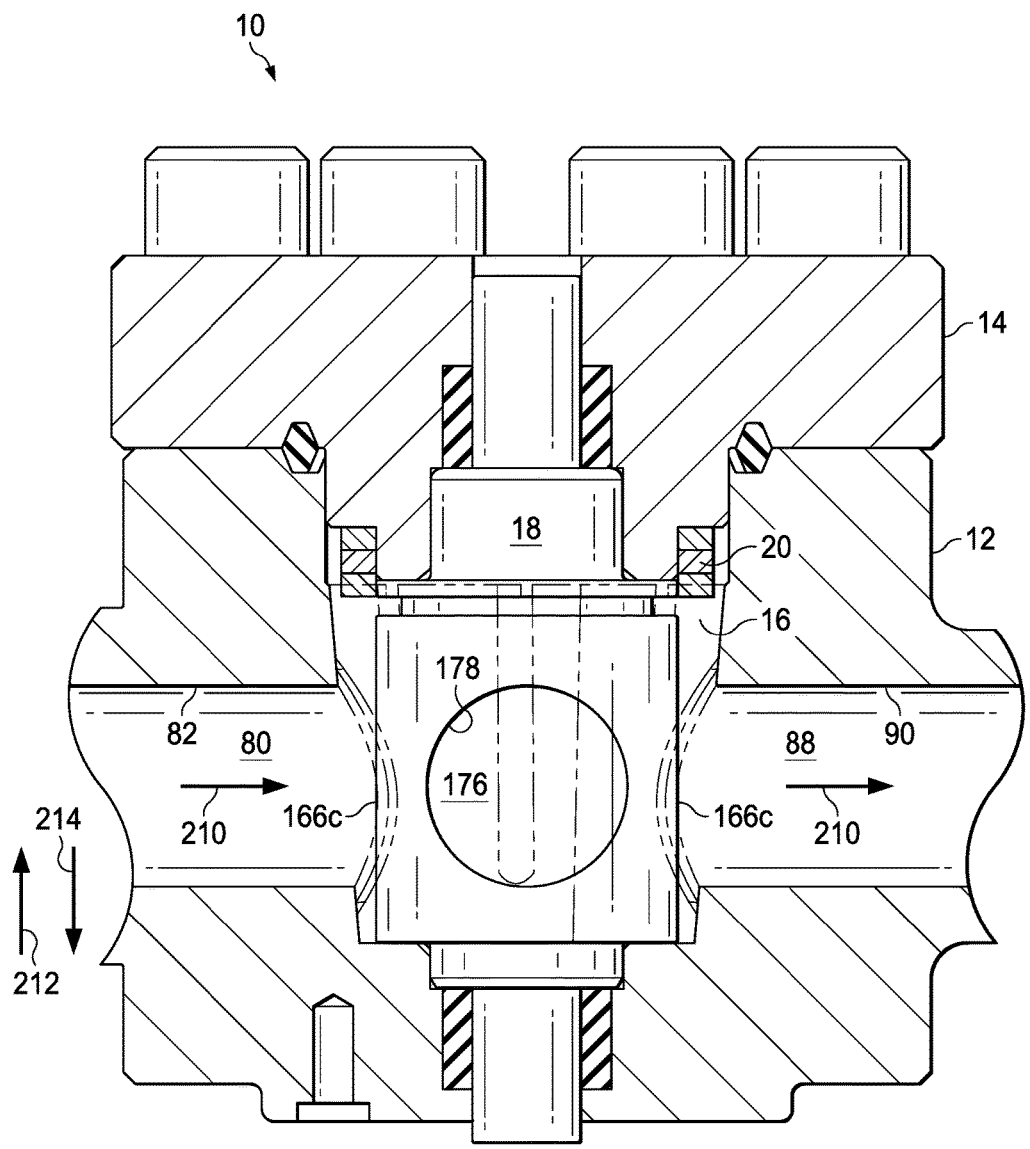
FIG. 8B is a sectional view similar to that of FIG. 8A, but illustrates the plug valve in a closed configuration, according to an exemplary embodiment.

In operation, an exemplary embodiment of which is illustrated in FIGS. 8A and 8B, with continuing reference to FIG. 7, the plug valve 10 is actuable between an open configuration and a closed configuration to control the flow of a fluid 210. The plug valve 10 is actuated by engaging a tool (not shown) such as, for example, a handle or a wheel, in the socket 206 (visible in FIG. 7) to rotate the plug 18 relative to the valve body 12, the bonnet 14, and the tapered insert 16. The rotation of the plug 18 causes the annular groove 174 of the plug 18 to slidably engage the annular tongue 148 of the tapered insert 16, thus actuating the plug valve 10 between the open configuration and the closed configuration.

In the open configuration, as shown in FIG. 8A, the fluid passage 176 of the plug 18 is in fluid communication with the fluid passages 80 and 88 of the valve body 12 via the fluid passages 142a and 142b, respectively, of the tapered insert 16. As a result, the fluid 210 is communicated from the fluid passage 80 to the fluid passage 88, as shown in FIG. 8A. Ideally, to prevent turbulence in the flow of the fluid 210 and resultant wear to the components of the plug valve 10, the cylindrical surface 178 of the plug 18 is substantially aligned with the cylindrical surfaces 82 and 90 of the valve body 12 and the cylindrical surfaces 144a and 144b of the tapered insert 16. However, axial forces such as, for example, hydraulic lift caused by the flow of the fluid 210, may be imparted to the tapered insert 16 and/or the plug 18 in an axial direction 212. Such axial forces tend to cause misalignment between the cylindrical surfaces 144a and 144b of the tapered insert 16 and the cylindrical surfaces 82 and 90, respectively, of the valve body 12. At the same time, the interlocking of the annular tongue 148 with the annular groove 174 prevents, or at least reduces, misalignment between the cylindrical surface 178 of the plug 18 and the cylindrical surfaces 144a and 144b of the tapered insert 16.

The biasing member 20 counteracts the axial forces imparted to the tapered insert 16 and/or the plug 18 in the axial direction 212 by urging the tapered insert 16 in an axial direction 214, which is substantially opposite the axial direction 212. In this manner, the biasing member 20 maintains the substantial alignment between the cylindrical surfaces 144a and 144b of the tapered insert 16 and the cylindrical surfaces 82 and 90 of the valve body 12. At the same time, the interlocking of the annular tongue 148 with the annular groove 174 maintains the substantial alignment between the cylindrical surface 178 of the plug 18 and the cylindrical surfaces 144a and 144b of the tapered insert 16. The force imparted to the tapered insert 16 by the biasing member 20 resolves into a normal contacting force between the plug 18 and the opposing sections 134 and 136 of the tapered insert 16.

The lubrication ports 46a and 46b receive the grease fittings 30a and 30b, respectively, to permit the pumping of a lubrication fluid into the valve body 12. In several exemplary embodiments, a lubrication fluid is pumped into the plug valve 10 via at least one of the grease fittings 30a and 30b and a corresponding one of the lubrication ports 46a and 46b to lubricate and seal the interface between the plug 18 and the tapered insert 16. The lubrication fluid migrates into an annular space defined between the tapered insert 16 and the plug 18. As a result, the normal contacting force between the plug 18 and the opposing sections 134 and 136 of the tapered insert 16 causes the lubrication fluid to form a seal, thus preventing, or at least reducing, leakage of the fluid 210 into the annular space between the tapered insert 16 and the plug 18. Moreover, as the fluid 210 is communicated between the fluid passages 80 and 88 of the valve body 12, the seals (not shown) in the annular grooves 146a and 146b prevent, or at least obstruct, leakage of the fluid 210 into an annular space defined between the valve body 12 and the tapered insert 16.

In the closed configuration, as shown in FIG. 8B, the plug 18 is rotated to prevent, or at least obstruct, communication of the fluid 210 between the fluid passages 80 and 88 of the valve body 12. Specifically, when the plug 18 is rotated roughly 90 degrees from the open configuration (shown in FIG. 8A), the fluid passage 176 of the plug 18 is no longer substantially aligned with the fluid passages 142a and 142b of the tapered insert 16 or the fluid passages 80 and 88 of the valve body 12. Instead, the exterior surface 166c of the plug 18 is substantially aligned with the fluid passages 142a and 142b of the tapered insert 16 and the fluid passages 80 and 88 of the valve body 12. As discussed above, the lubrication fluid pumped into the plug valve 10 migrates into an annular space defined between the tapered insert 16 and the plug 18. As a result, the normal contacting force between the plug 18 and the opposing sections 134 and 136 of the tapered insert 16 causes the lubrication fluid to form a seal, thus preventing, or at least reducing, leakage of the fluid 210 into the annular space between the tapered insert 16 and the plug 18. Moreover, the seals (not shown) in the annular grooves 146a and 146b prevent, or at least obstruct, leakage of the fluid 210 into an annular space defined between the valve body 12 and the tapered insert 16. As a result, the plug 18 prevents, or at least obstructs, communication of the fluid 210 between the fluid passages 80 and 88 of the valve body 12.

In several exemplary embodiments, even with the extreme pressures, temperatures, and flow rates encountered by the plug valve 10 during operation, the biasing member 20 maintains the substantial alignment between the cylindrical surfaces 144a and 144b of the tapered insert 16 and the cylindrical surfaces 82 and 90 of the valve body 12. In several exemplary embodiments, despite the thermal expansion or contraction of the various components of the plug valve 10 during operation, the biasing member 20 maintains the substantial alignment between the cylindrical surfaces 144a and 144b of the tapered insert 16 and the cylindrical surfaces 82 and 90 of the valve body 12. In several exemplary embodiments, regardless of the axial forces imparted to the tapered insert 12 and/or the plug 18 during operation of the plug valve 10, the biasing member 20 maintains the substantial alignment between the cylindrical surfaces 144a and 144b of the tapered insert 16 and the cylindrical surfaces 82 and 90 of the valve body 12.

In several exemplary embodiments, even with the extreme pressures, temperatures, and flow rates encountered by the plug valve 10 during operation, the interlocking of the annular tongue 148 with the annular groove 174 maintains the substantial alignment between the cylindrical surface 178 of the plug 18 and the cylindrical surfaces 144a and 144b of the tapered insert 16. In several exemplary embodiments, despite the thermal expansion or contraction of the various components of the plug valve 10 during operation, the interlocking of the annular tongue 148 with the annular groove 174 maintains the substantial alignment between the cylindrical surface 178 of the plug 18 and the cylindrical surfaces 144a and 144b of the tapered insert 16. In several exemplary embodiments, regardless of the axial forces imparted to the tapered insert 12 and/or the plug 18 during operation of the plug valve 10, the interlocking of the annular tongue 148 with the annular groove 174 maintains the substantial alignment between the cylindrical surface 178 of the plug 18 and the cylindrical surfaces 144a and 144b of the tapered insert 16.

In several exemplary embodiments, even with the extreme pressures, temperatures, and flow rates encountered by the plug valve 10 during operation, the crushing of the metal ring seal 24 within the respective annular grooves 40 and 106 of the valve body 12 and the bonnet 14 prevents, or at least reduces, leakage of a fluid from the interior of the plug valve 10 to atmosphere. In several exemplary embodiments, despite the thermal expansion or contraction of the various components of the plug valve 10 during operation, the crushing of the metal ring seal 24 within the respective annular grooves 40 and 106 of the valve body 12 and the bonnet 14 prevents, or at least reduces, leakage of a fluid from the interior of the plug valve 10 to atmosphere. In several exemplary embodiments, regardless of the axial forces imparted to the tapered insert 12 and/or the plug 18 during operation of the plug valve 10, the crushing of the metal ring seal 24 within the respective annular grooves 40 and 106 of the valve body 12 and the bonnet 14 prevents, or at least reduces, leakage of a fluid from the interior of the plug valve 10 to atmosphere.

In several exemplary embodiments, the wear, erosion, and/or complete wash-out of the plug valve 10, including the valve body 12, the bonnet 14, the insert 16, and/or the plug 18, is prevented, or at least reduced, as a result of the biasing member 20 maintaining the substantial alignment between the cylindrical surfaces 144a and 144b of the tapered insert 16 and the cylindrical surfaces 82 and 90 of the valve body 12. In several exemplary embodiments, the wear, erosion, and/or complete wash-out of the plug valve 10, including the valve body 12, the bonnet 14, the insert 16, and/or the plug 18, is prevented, or at least reduced, as a result of the annular tongue 148 interlocking with the annular groove 174 to maintain the substantial alignment between the cylindrical surface 178 of the plug 18 and the cylindrical surfaces 144a and 144b of the tapered insert 16.

In several exemplary embodiments, the fasteners 22 are omitted in favor of threads on the exterior of the bonnet 14, the threads being adapted to threadably engage the valve body 12 to secure the tapered insert 16 and the plug 18 within the cavity 38. In several exemplary embodiments, the biasing member 20 is omitted and the bonnet 14 directly engages the tapered insert 16. Accordingly, the bonnet 14 may take the form of a threaded cap in some embodiments.

In several exemplary embodiments, rather than being split into the opposing sections 134 and 136, the tapered insert 16 is split into more than two sections, such as, for example, three sections, four sections, five sections, or more.

In several exemplary embodiments, rather than extending along the common longitudinal center axis 84, the fluid passages 80 and 88 extend along separate axes. Further, in several exemplary embodiments, rather than defining a common axis, the fluid passages 142a and 142b of the tapered insert 16 define separate axes so that the fluid passages 142a and 142b of the tapered insert 16 remain substantially aligned with the fluid passages 80 and 88 of the valve body 12. Further still, in several exemplary embodiments, rather than extending along the longitudinal center axis 180, the fluid passage 176 of the plug 18 is divided into separate sections each extending along separate axes so that the fluid passage remains substantially aligned with the fluid passages 142a and 142b when the plug valve 10 is in the open configuration.

The present disclosure introduces a plug valve, including a valve body defining a cavity and a pair of fluid passages intersecting the cavity, the cavity defining a tapered interior surface of the valve body; a plug extending within the cavity of the valve body, the plug defining an exterior surface and a fluid passage adapted to be substantially aligned with the fluid passages of the valve body; an insert extending within the cavity and circumferentially about at least a portion of the plug, the insert defining a pair of fluid passages substantially aligned with each of the fluid passages of the valve body, respectively; a bonnet connected to the valve body to secure the plug and the insert within the cavity; and a biasing member constrained between the bonnet and the insert. In an exemplary embodiment, the bonnet includes a flange connected to the valve body and axially immovable relative thereto, and a first protrusion extending from the flange, the first protrusion defining an annular shoulder; and the biasing member is constrained axially between the insert and the annular shoulder of the first protrusion. In an exemplary embodiment, the bonnet includes a second protrusion about which the biasing member extends, the second protrusion extending from the first protrusion and defining an end face; the plug includes a valve cylinder through which the fluid passage of the plug is formed, the valve cylinder defining an end face; and the end face of the second protrusion abuts, or nearly abuts, the end face of the valve cylinder. In an exemplary embodiment, the biasing member includes one or more frusto-conical spring washers, at least one of which extends about the second protrusion. In an exemplary embodiment, first and second annular grooves are formed in the valve body and the flange, respectively; the plug valve further includes a metal ring seal extending within the first and second annular grooves; and the metal ring seal is crushed between the flange and the valve body to prevent, or at least reduce, the leakage of a fluid from the interior of the valve body to atmosphere. In an exemplary embodiment, the plug is adapted to rotate, relative to the insert, to an open configuration in which the fluid passage of the plug is substantially aligned with the fluid passages of the insert so that the fluid passages of the valve body are in fluid communication with one another via the fluid passages of the insert and the fluid passage of the plug. In an exemplary embodiment, an annular tongue extends along one of the insert and the plug and an annular groove is formed in the other of the insert and the plug; and the annular tongue and the annular groove interlock with one another so that, when the plug is in the open configuration, the fluid passage of the plug is substantially aligned with each of the fluid passages of the insert. In an exemplary embodiment, the biasing member urges the insert to engage the tapered interior surface of the valve body, resulting in a normal contacting force between the insert and the exterior surface of the plug. In an exemplary embodiment, the biasing member maintains the substantial alignment between the fluid passages of the insert and the fluid passages of the valve body, respectively, by urging the insert to engage the tapered interior surface of the valve body. In an exemplary embodiment, the plug is adapted to rotate, relative to the insert, to a closed configuration in which the fluid passages of the insert are substantially aligned entirely with respective portions of the exterior surface of the plug so that fluid communication between the respective fluid passages of the valve body is blocked by the exterior surface of the plug. In an exemplary embodiment, a pair of annular grooves are formed in respective faces of the bonnet and the valve body, the respective faces of the bonnet and the valve body engaging one another so that the respective annular grooves are substantially aligned; the plug valve further includes a metal ring seal extending within the respective annular grooves of the bonnet and the valve body; and the metal ring seal is crushed between the bonnet and the valve body to prevent, or at least reduce, the leakage of a fluid from the interior of the valve body to atmosphere. In an exemplary embodiment, the insert includes a pair of sections adapted to abut, or nearly abut, one another along a longitudinal plane; and each of the sections includes a respective one of the fluid passages of the insert.

The present disclosure also introduces a plug valve, including a valve body defining a cavity and a pair of fluid passages intersecting the cavity, the cavity defining a tapered interior surface of the valve body; a plug extending within the cavity of the valve body, the plug defining an exterior surface and a fluid passage adapted to be substantially aligned with each of the fluid passages of the valve body; an insert extending within the cavity and circumferentially about at least a portion of the plug, the insert defining a pair of fluid passages substantially aligned with the fluid passages of the valve body, respectively; an annular groove formed in one of the plug and the insert; and an annular tongue extending along the other of the plug and the insert, the annular tongue being adapted to interlock with the annular groove. In an exemplary embodiment, the plug is adapted to rotate, relative to the insert, to an open configuration in which the fluid passage of the plug is substantially aligned with the fluid passages of the insert so that the fluid passages of the valve body are in fluid communication with one another via the fluid passages of the insert and the fluid passage of the plug. In an exemplary embodiment, when the plug is in the open configuration, the interlocking of the annular tongue with the annular groove aligns the fluid passage of the plug with the fluid passages of the insert. In an exemplary embodiment, the plug is adapted to rotate, relative to the insert, to a closed configuration in which the fluid passages of the insert are substantially aligned entirely with respective portions of the exterior surface of the plug so that fluid communication between the respective fluid passages of the valve body is blocked by the exterior surface of the plug. In an exemplary embodiment, the insert engages the tapered interior surface of the valve body, resulting in a normal contacting force between the insert and the exterior surface of the plug. In an exemplary embodiment, the insert includes a pair of sections adapted to abut, or nearly abut, one another along a longitudinal plane; and each of the sections includes a respective one of the fluid passages of the insert.

The present disclosure also introduces a plug valve, including a valve body defining a face, a cavity formed in the face, and a pair of fluid passages intersecting the cavity, the cavity defining a tapered interior surface of the valve body; a plug extending within the cavity of the valve body, the plug defining an exterior surface and a fluid passage adapted to be substantially aligned with each of the fluid passages of the valve body; an insert extending within the cavity and circumferentially about at least a portion of the plug, the insert defining a pair of fluid passages substantially aligned with the fluid passages of the valve body, respectively; and a bonnet connected to the valve body to secure the plug and the insert within the cavity, the bonnet defining a face that engages the face of the valve body; wherein a pair of annular grooves are formed in the respective faces of the bonnet and the valve body, the respective annular grooves being substantially aligned with one another. In an exemplary embodiment, the plug valve further includes a metal ring seal extending within the respective annular grooves of the bonnet and the valve body; and the metal ring seal is crushed between the bonnet and the valve body to prevent, or at least reduce, leakage of a fluid from the interior of the valve body to atmosphere. In an exemplary embodiment, the plug is adapted to rotate, relative to the insert, to an open configuration in which the fluid passage of the plug is substantially aligned with the fluid passages of the insert so that the fluid passages of the valve body are in fluid communication with one another via the fluid passages of the insert and the fluid passage of the plug. In an exemplary embodiment, an annular tongue extends along one of the insert and the plug and an annular groove is formed in the other of the insert and the plug; and the annular tongue and the annular groove interlock with one another so that, when the plug is in the open configuration, the fluid passage of the plug is substantially aligned with the fluid passages of the insert. In an exemplary embodiment, the plug is adapted to rotate relative to the insert to a closed configuration, in which the fluid passages of the insert are substantially aligned entirely with respective portions of the exterior surface of the plug so that fluid communication between the respective fluid passages of the valve body is blocked by the exterior surface of the plug. In an exemplary embodiment, the insert includes a pair of sections adapted to abut, or nearly abut, one another along a longitudinal plane; and each of the sections includes a respective one of the fluid passages of the insert.

The present disclosure also introduces a method that includes actuating a plug valve from a closed configuration to an open configuration; wherein the plug valve includes: a valve body defining a cavity and a pair of fluid passages intersecting the cavity, the cavity defining a tapered interior surface of the valve body; a plug extending within the cavity of the valve body, the plug defining an exterior surface and a fluid passage adapted to be substantially aligned with the fluid passages of the valve body when the plug valve is in the open configuration; and an insert extending within the cavity and circumferentially about at least a portion of the plug, the insert defining a pair of fluid passages substantially aligned with each of the fluid passages of the valve body, respectively; wherein actuating the plug valve to the open configuration causes fluid to flow from one of the fluid passages of the valve body to the other of the fluid passages of the valve body; and wherein, during the fluid flow, an axial force is imparted to the insert and/or the plug in a first axial direction; and counteracting the axial force imparted to the insert and/or the plug in the first axial direction, including urging the insert in a second axial direction that is substantially opposite the first axial direction; wherein urging the insert in the second axial direction maintains the substantially alignment between the pair of fluid passages of the insert and each of the fluid passages of the valve body, respectively. In an exemplary embodiment, the insert includes opposing sections through which the pair of fluid passages of the insert are formed, respectively; and wherein urging the insert in the second axial direction results in a force being imparted to the insert, the force being imparted to the insert resolving into a normal contacting force between the plug and the opposing sections of the insert. In an exemplary embodiment, the method includes permitting a lubrication fluid to migrate into an annular space defined between the insert and the plug; wherein the normal contacting force between the plug and the opposing sections of the insert causes the lubrication fluid to form a seal, thus preventing, or at least reducing, leakage of the fluid flow into the annular spaced defined between the insert and the plug.

The present disclosure also introduces a method that includes actuating a plug valve from a closed configuration to an open configuration; wherein the plug valve includes: a valve body defining a cavity and a pair of fluid passages intersecting the cavity, the cavity defining a tapered interior surface of the valve body; a plug extending within the cavity of the valve body, the plug defining an exterior surface and a fluid passage adapted to be substantially aligned with each of the fluid passages of the valve body when the plug valve is in the open configuration; an insert extending within the cavity and circumferentially about at least a portion of the plug, the insert defining a pair of fluid passages substantially aligned with the fluid passages of the valve body, respectively; an annular groove formed in one of the plug and the insert; and an annular tongue extending along the other of the plug and the insert; and aligning the fluid passage of the plug with the fluid passages of the insert when the plug valve is in the open configuration, including interlocking the annular tongue with the annular groove. In an exemplary embodiment, actuating the plug valve from the closed configuration to the open configuration includes rotating the plug, relative to the insert, so that the fluid passage of the plug is substantially aligned with the fluid passages of the insert and thus the fluid passages of the valve body are in fluid communication with one another via the fluid passages of the insert and the fluid passage of the plug.

The present disclosure also introduces a method that includes providing a valve body defining a face, a cavity formed in the face, and a pair of fluid passages intersecting the cavity, the cavity defining a tapered interior surface of the valve body; positioning an insert and a plug within the cavity of the valve body, the insert extending circumferentially about at least a portion of the plug, the insert defining a pair of fluid passages substantially aligned with the fluid passages of the valve body, respectively, the plug defining an exterior surface and a fluid passage adapted to be substantially aligned with each of the fluid passages of the valve body; connecting a bonnet to the valve body to secure the plug and the insert within the cavity, the bonnet defining a face that engages the face of the valve body; and crushing a metal ring seal between the bonnet and the valve body to prevent, or at least reduce, leakage of a fluid from the interior of the valve body to atmosphere. In an exemplary embodiment, a pair of annular grooves are formed in the respective faces of the bonnet and the valve body, the respective annular grooves being substantially aligned with one another; wherein the metal ring seal extends within the respective annular grooves of the bonnet and the valve body.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method, comprising:
engaging a valve body and an insert in a manner that permits relative movement between the insert and the valve body in one, or both, of first and second opposing axial directions;
substantially aligning first and second fluid passages of the insert with third and fourth fluid passages of the valve body, respectively, the valve body defining a cavity from which the third and fourth fluid passages extend, and the insert extending within the cavity; and
preventing, or at least reducing, relative movement between the insert and a plug in both of the first and second opposing axial directions, the plug defining a fifth fluid passage and extending within the cavity of the valve body so that the fifth fluid passage is substantially alignable with the first and second fluid passages of the insert;
wherein preventing, or at least reducing, relative movement between the insert and the plug in both of the first and second opposing axial directions comprises interlocking an annular tongue extending along one of the plug and the insert with an annular groove formed in the other of the plug and the insert.

2. The method of claim 1, further comprising rotating the plug relative to the insert to an open configuration, in which the fifth fluid passage of the plug is substantially aligned with the first and second fluid passages of the insert so that the third and fourth fluid passages of the valve body are in fluid communication with each other via the first, second, and fifth fluid passages.

3. The method of claim 2, wherein, when the plug is in the open configuration, the interlocking of the annular tongue with the annular groove substantially aligns the fifth fluid passage of the plug with the first and second fluid passages of the insert.

4. The method of claim 1, further comprising rotating the plug relative to the insert to a closed configuration, in which the first and second fluid passages of the insert are substantially aligned entirely with respective portions of an exterior surface of the plug so that fluid communication via the fifth fluid passage of the plug between the third and fourth fluid passages of the valve body is prevented, or at least reduced.

5. The method of claim 1, further comprising engaging the insert with a tapered interior surface of the valve body to produce a normal contacting force between the insert and an exterior surface of the plug.

6. The method of claim 1, wherein the insert comprises first and second sections that abut, or nearly abut, one another along one or more longitudinal planes; and
wherein the first and second sections define the respective first and second fluid passages of the insert.

7. The method of claim 1, wherein the annular groove is formed in the plug, and the annular tongue extends along the insert.

8. The method of claim 1, further comprising biasing, using a biasing member, the insert in one of the first and second opposing axial directions to establish and/or maintain the substantial alignment of the first and second fluid passages of the insert with the respective third and fourth fluid passages of the valve body.

9. The method of claim 8, further comprising connecting a bonnet to the valve body to secure the plug and the insert within the cavity, wherein the biasing member is constrained against the bonnet.

10. The method of claim 1, further comprising threadably connecting a threaded cap to the valve body to secure the plug and the insert within the cavity, wherein the threaded cap is configured to urge the insert in one of the first and second opposing axial directions to establish the substantial alignment of the first and second fluid passages of the insert with the respective third and fourth fluid passages of the valve body.

11. A plug valve, comprising:
a valve body defining a first fluid passage, a second fluid passage, and a cavity from which the first and second fluid passages extend;
an insert defining third and fourth fluid passages, the insert extending within the cavity so that the third and fourth fluid passages are substantially aligned with the first and second fluid passages, respectively;
a plug defining a fifth fluid passage and extending within the cavity of the valve body so that the fifth fluid passage is substantially alignable with the third and fourth fluid passages of the insert;
an annular groove formed in one of the plug and the insert; and
an annular tongue extending along the other of the plug and the insert;
wherein the valve body and the insert are engaged in a manner that permits relative movement between the insert and the valve body in one, or both, of first and second opposing axial directions; and
wherein the annular tongue interlocks with the annular groove to prevent, or at least reduce, relative movement between the plug and the insert in both of the first and second opposing axial directions.

12. The plug valve of claim 11, wherein the plug is rotatable relative to the insert to an open configuration, in which the fifth fluid passage of the plug is substantially aligned with the third and fourth fluid passages of the insert so that the first and second fluid passages of the valve body are in fluid communication with each other via the third, fourth, and fifth fluid passages.

13. The plug valve of claim 12, wherein, when the plug is in the open configuration, the interlocking of the annular tongue with the annular groove substantially aligns the fifth fluid passage of the plug with the third and fourth fluid passages of the insert.

14. The plug valve of claim 11, wherein the plug is rotatable relative to the insert to a closed configuration, in which the third and fourth fluid passages of the insert are substantially aligned entirely with respective portions of an exterior surface of the plug so that fluid communication via the fifth fluid passage of the plug between the first and second fluid passages of the valve body is prevented, or at least reduced.

15. The plug valve of claim 11, wherein the insert engages a tapered interior surface of the valve body, resulting in a normal contacting force between the insert and an exterior surface of the plug.

16. The plug valve of claim 11, wherein the insert comprises first and second sections that abut, or nearly abut, one another along one or more longitudinal planes; and
wherein the first and second sections define the respective third and fourth fluid passages of the insert.

17. The plug valve of claim 11, wherein the annular groove is formed in the plug, and the annular tongue extends along the insert.

18. The plug valve of claim 11, further comprising a biasing member that biases the insert in one of the first and second opposing axial directions to establish and/or maintain the substantial alignment of the third and fourth fluid passages of the insert with the respective first and second fluid passages of the valve body.

19. The plug valve of claim 18, further comprising a bonnet connected to the valve body to secure the plug and the insert within the cavity, wherein the biasing member is constrained against the bonnet.

20. The plug valve of claim 11, further comprising a threaded cap threadably connected to the valve body to secure the plug and the insert within the cavity, the threaded cap being configured to urge the insert in one of the first and second opposing axial directions to establish the substantial alignment of the third and fourth fluid passages of the insert with the respective first and second fluid passages of the valve body.

* * * * *